N. & J. WAGNER.
WINDMILL.
APPLICATION FILED MAR. 19, 1908.
930,905.
Patented Aug. 10, 1909.
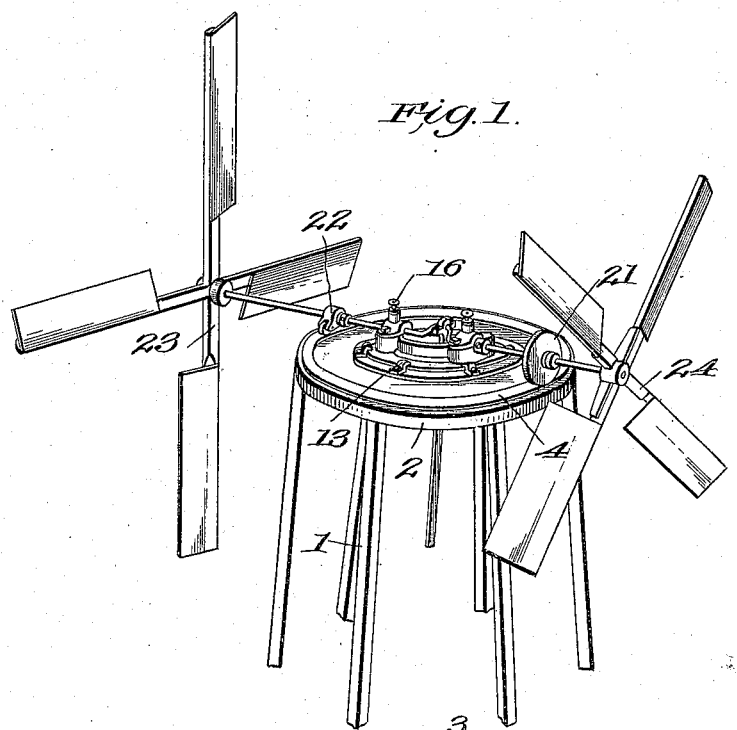
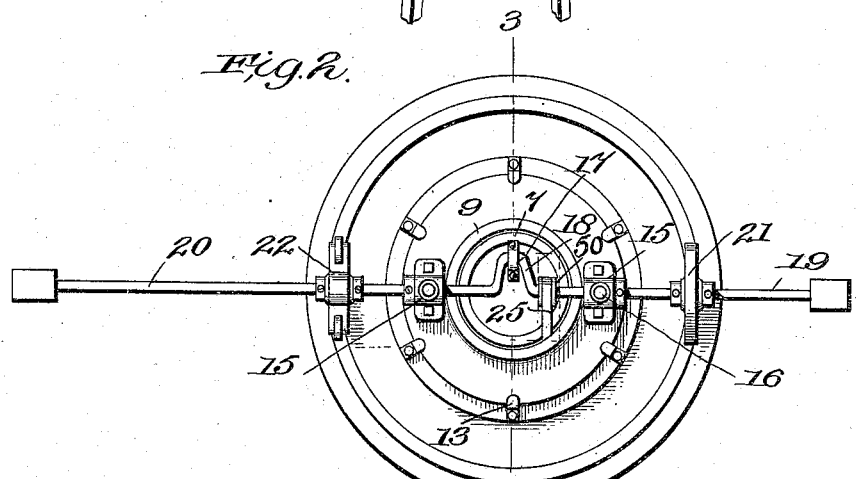
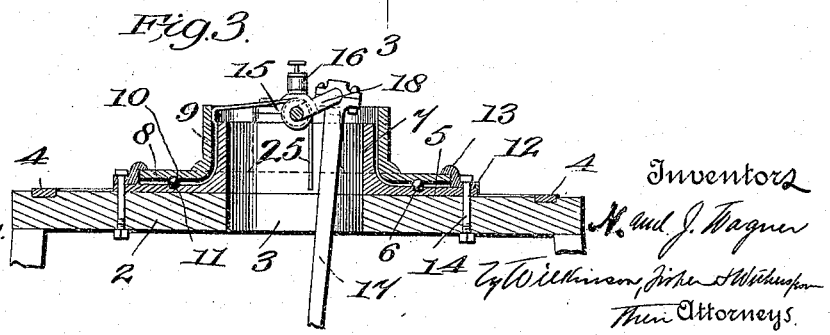

UNITED STATES PATENT OFFICE.

NICKOLAUS WAGNER AND JACOB WAGNER, OF CALDWELL, IDAHO.

WINDMILL.

No. 930,905.     Specification of Letters Patent.     Patented Aug. 10, 1909.

Application filed March 19, 1908. Serial No. 422,132.

*To all whom it may concern:*

Be it known that we, NICKOLAUS WAGNER and JACOB WAGNER, citizens of the United States, residing at Caldwell, in the county of Canyon and State of Idaho, have invented certain new and useful Improvements in Windmills; and we do hereby declare the following to be a full, clear, and exact description of the invention, such as will enable others skilled in the art to which it appertains to make and use the same.

This invention relates to improvements in windmills, and while especially designed for use in connection with irrigating arid fields, may be employed in many other relations where the generation of power is required.

One of the principal objects of the invention is to provide a machine that is not only of a simple and durable structure automatically adjusting itself to the changes in the direction of the wind, but which will produce additional power.

Another feature of the invention is the employment of a pair of wind wheels of different diameters mounted on the ends of a crank shaft which extend for different lengths from the crank.

While the invention is not restricted to the exact details shown and described, still for the purpose of disclosure reference is had to the accompanying drawings illustrating a practical embodiment of the same, in which drawings like numerals designate the same parts in the several views, and in which—

Figure 1 is a perspective view of a suitable support with the invention applied. Fig. 2 is a plan view with the wind wheels omitted, and Fig. 3 is a vertical section on the line 3—3 of Fig. 2.

1 designates a suitable structural support provided with the bed 2 centrally apertured, as at 3, and having mounted thereon a circular metal track 4.

5 designates the bed plate which is of annular construction, and is provided with annular grooves 6 forming a raceway for balls. The base portion of the bed plate 5 is provided with a cylindrical extension 7 registering with the opening 3 in the bed.

8 designates the annular base of a revoluble support, which is of the same construction as the bed plate 5, the annular base 8, however, being slightly less in diameter, and the cylindrical extension 9 being slightly greater in diameter. The revoluble member is also provided with an annular groove 10 alining with the groove 6 and forming therewith a raceway for the reception of the balls 11 to provide a ball bearing support between said revoluble member and said bed plate. A plurality of guide members are arranged around the edge of said bed plate and consist of the base sections 12 and the offset projections 13 extending in the opposite direction to said base section over the edge of the annular base 8 of the revoluble support. The guide members and the bed plate are rigidly secured together and to the bed by means of bolts 14 passing therethrough. On the annular base 8 of the revoluble support are mounted the bearings 15 for the crank shaft, and these bearings may be provided with the lubricating cups 16.

17 designates the pitman connected to a crank 18 forming a part of a crank shaft, one end of which extends a greater distance from said crank than the other.

In the drawings the shorter end of the crank shaft is designated as at 19, and the longer end as at 20, and the longer end is one-third longer than the shorter end. One of these ends carries a supporting wheel 21, and the other may be provided with a carriage 22 having a pair of smaller wheels, said wheels being adapted to engage the circular track 4. The carriage 22 is so arranged that it may always engage the track, but the wheel 21 only comes into engagement therewith when it is necessary to support the weight of the shaft and prevent the same from bending or straining in the case of heavy winds or other causes imparting undue strain on the shaft.

23 represents one of the wind wheels mounted on the long end of the shaft 20, and is provided with any suitable form of vanes, the diameter of said wheel, however, being greater than the diameter of a smaller wheel 24 mounted on the short end of the shaft 19, in the drawings the dimension of the larger wheel 23 being one-third greater than that of the smaller wheel 24.

The objects of providing a shorter end for the crank shaft and of placing the smaller wheel 21 on the same are:—By mounting a wheel of any size as close as possible to the bearings of the shaft, it will be given a firmer support in its bearings when operating in high winds; and by making this particular wheel smaller than the outer wheel it is less liable to injury in high winds and does not deliver so great an excess of power as would be the case were it made larger. Again, by placing the larger wheel on the longer end of the axle, it has a greater leverage in adjusting itself to the wind and will therefore be more certain to move into its adjusted position in light winds, than would be the case if it were placed on the short end of the axle.

Any suitable braking means may be provided, and in the drawings is represented at 25 as comprising a spring band secured at one end to the extension 9 of the revolving member and at its other end passing over a braking or friction pulley 50 carried by the shaft, the free, overhanging end of the spring band being connected to operating means not shown leading to the ground.

What we claim is:

1. In a windmill, the combination of a support, a crank shaft journaled thereon, the said shaft from its crank being substantially one-third longer on one side than on the other, a wind wheel carried by said shaft at each side of its crank, the wind wheel on the long end being of a diameter one-third greater than the wind wheel on the short end of said shaft, a wheel 21 carried by the short end of said shaft, and a circular track on which said wheel runs and adapted to support the same, substantially as described.

2. In a windmill, the combination of a stationary support; a revoluble support thereon; ball bearings between said supports; a crank shaft journaled on said revoluble support and extending unequal distances at each end beyond the same; a wind wheel carried by each end of said shaft, that on the shorter end being smaller than the wheel on the longer end; a carriage carried by said longer end; a supporting wheel carried by the shorter end of said shaft; and a circular track on which said carriage and wheel travel, substantially as described.

3. In a windmill, the combination of a stationary support comprising an annular base and a cylindrical upright extension, a revoluble support comprising an annular base of less diameter than the annular base of said stationary support and provided with a cylindrical extension of larger diameter than the cylindrical extension of said base support, said annular base portions being provided with annular grooves forming raceways, balls disposed in said raceways between said grooves, rigid guiding means having offsets projecting over the edge of the base of said revoluble support, a crank shaft mounted on said revoluble support, and a wind wheel carried by said crank shaft, substantially as described.

4. The combination of a stationary support, a revoluble support mounted thereon, bearings on said revoluble support, a crank shaft mounted in said bearings, rotating members comprising a carriage and a wheel carried by said shaft and adapted to roll on said stationary support, substantially as described.

In testimony whereof, we affix our signatures, in presence of two witnesses.

NICKOLAUS WAGNER.
JACOB WAGNER.

Witnesses:
C. H. DZNEK,
CHAS. GRANHOLM.